United States Patent [19]

Gill

[11] 4,016,795
[45] Apr. 12, 1977

[54] SELF-DRILLING SCREWS
[75] Inventor: Peter John Gill, Wolverhampton, England
[73] Assignee: GKN Screws & Fasteners Limited, Warley, England
[22] Filed: Oct. 20, 1975
[21] Appl. No.: 623,612

Related U.S. Application Data
[62] Division of Ser. No. 549,688, Feb. 13, 1975.

[52] U.S. Cl. .................................. 85/41; 10/10 R; 408/228
[51] Int. Cl.² ........................................ F16B 25/00
[58] Field of Search ................. 85/47, 41; 10/10 R; 408/230, 229, 228

[56] References Cited
UNITED STATES PATENTS

| | | | |
|---|---|---|---|
| 2,507,882 | 5/1950 | Berman | 85/47 |
| 3,125,923 | 3/1964 | Hanneman | 85/47 |
| 3,318,182 | 5/1967 | Carlson | 85/41 |
| 3,517,542 | 6/1970 | Skierski | 85/47 X |
| 3,517,581 | 6/1970 | Stokes et al. | 85/47 |

FOREIGN PATENTS OR APPLICATIONS 4,271   12/1874   United Kingdom ................... 85/47

Primary Examiner—Ramon S. Britts
Attorney, Agent, or Firm—Owen, Wickersham & Erickson

[57] ABSTRACT

A self-drilling and self-tapping fastener, particularly suitable for use in relatively thick metal, which is made from a headed blank by a method including pressing into the cylindrical free end of the blank a pair of straight flutes, by dies which are closed together on a line which is acutely angled to both the leading and trailing walls of the flutes. The flutes are inclined in opposite directions relative to the screw axis and are positioned on opposite sides of the screw. The tip is machined off to a V-form, to provide a ridge angularly advanced about the axis of the screw relative to the cutting edges of the flutes. Further machining may remove metal from the sides of the drill point between the flutes to provide flats and the drill point may be turned to a circular cross-section to provide sharp well-supported cutting edges for improved wear resistance. The drill point may taper overall, being of smallest diameter adjacent the threaded fastener shank.

1 Claim, 18 Drawing Figures

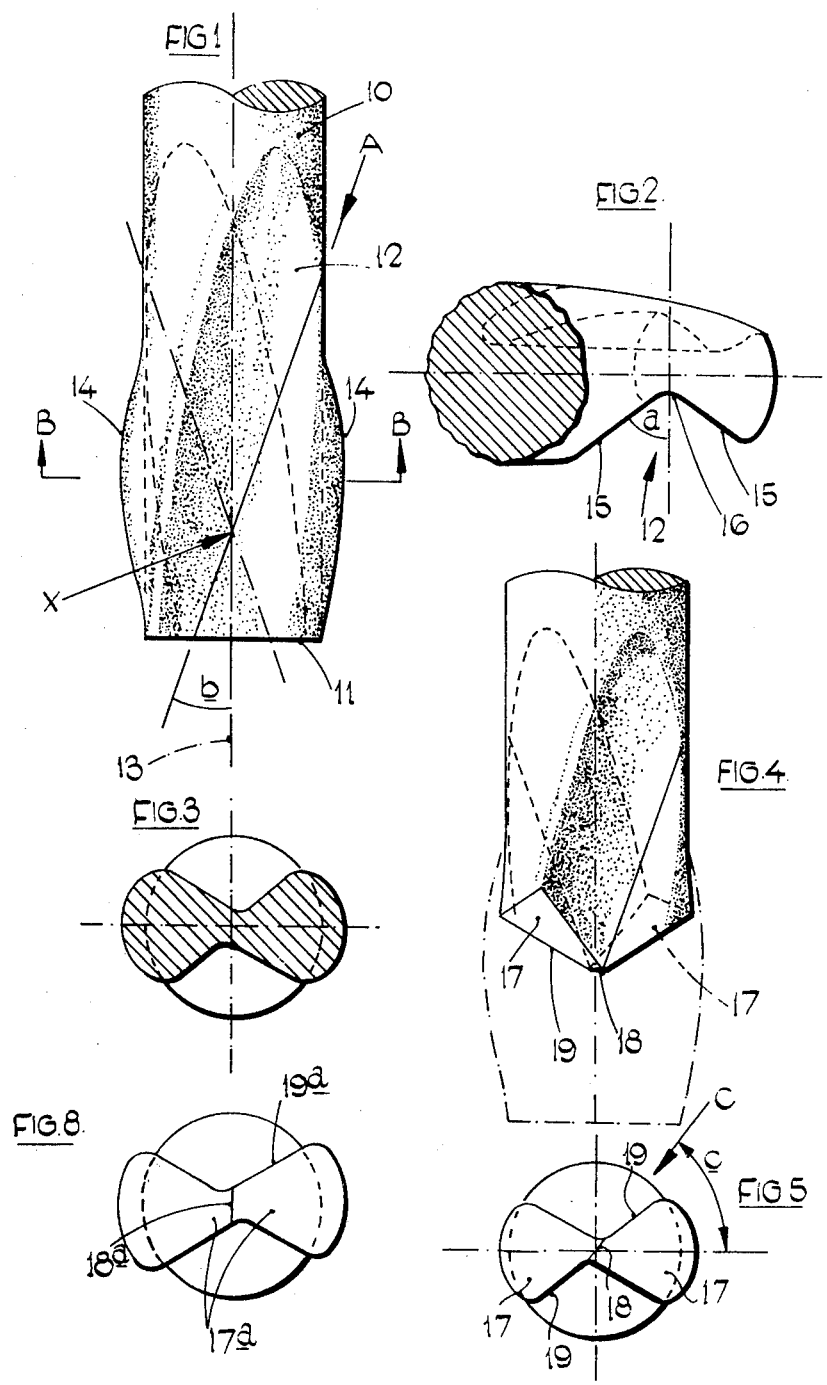

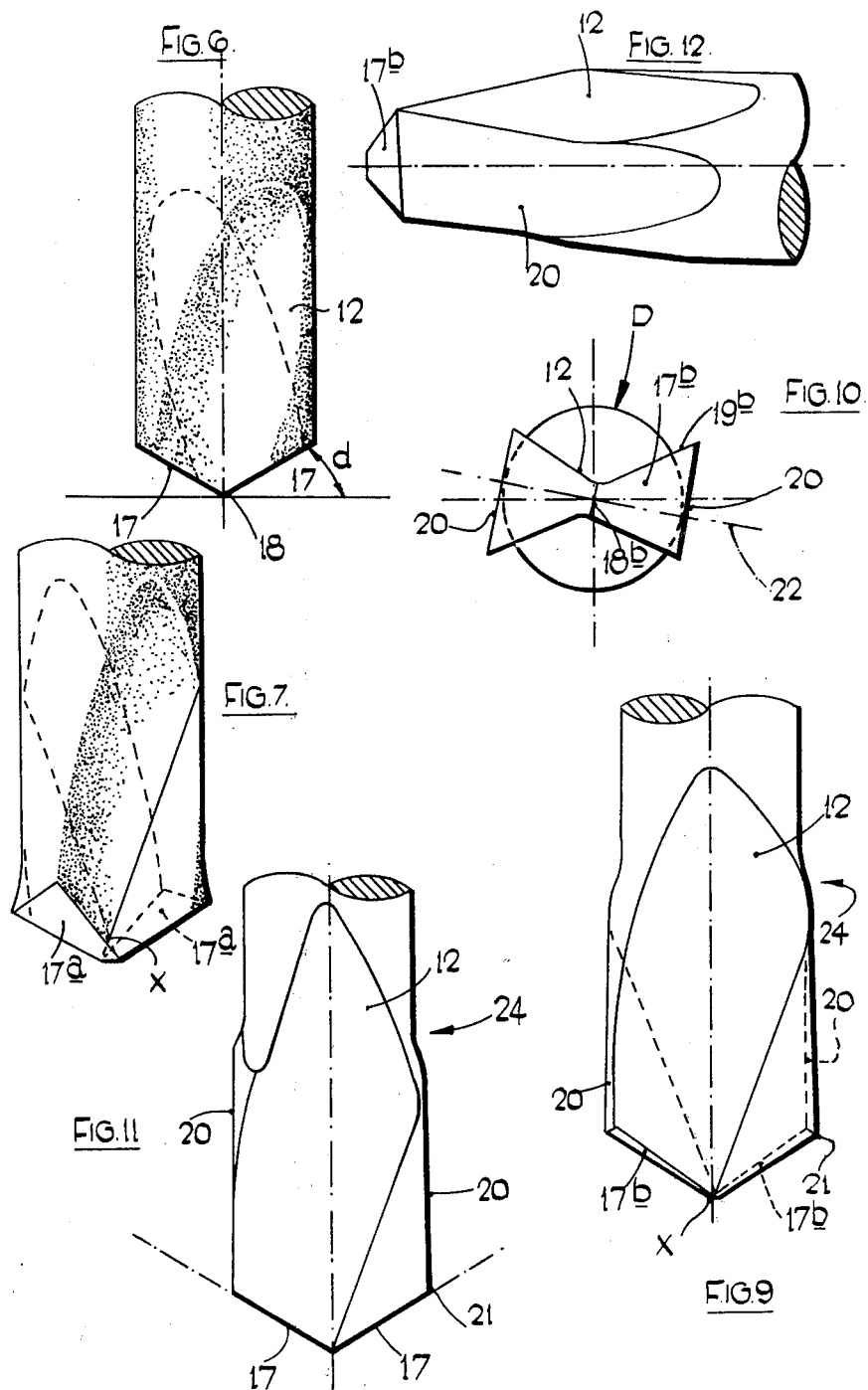

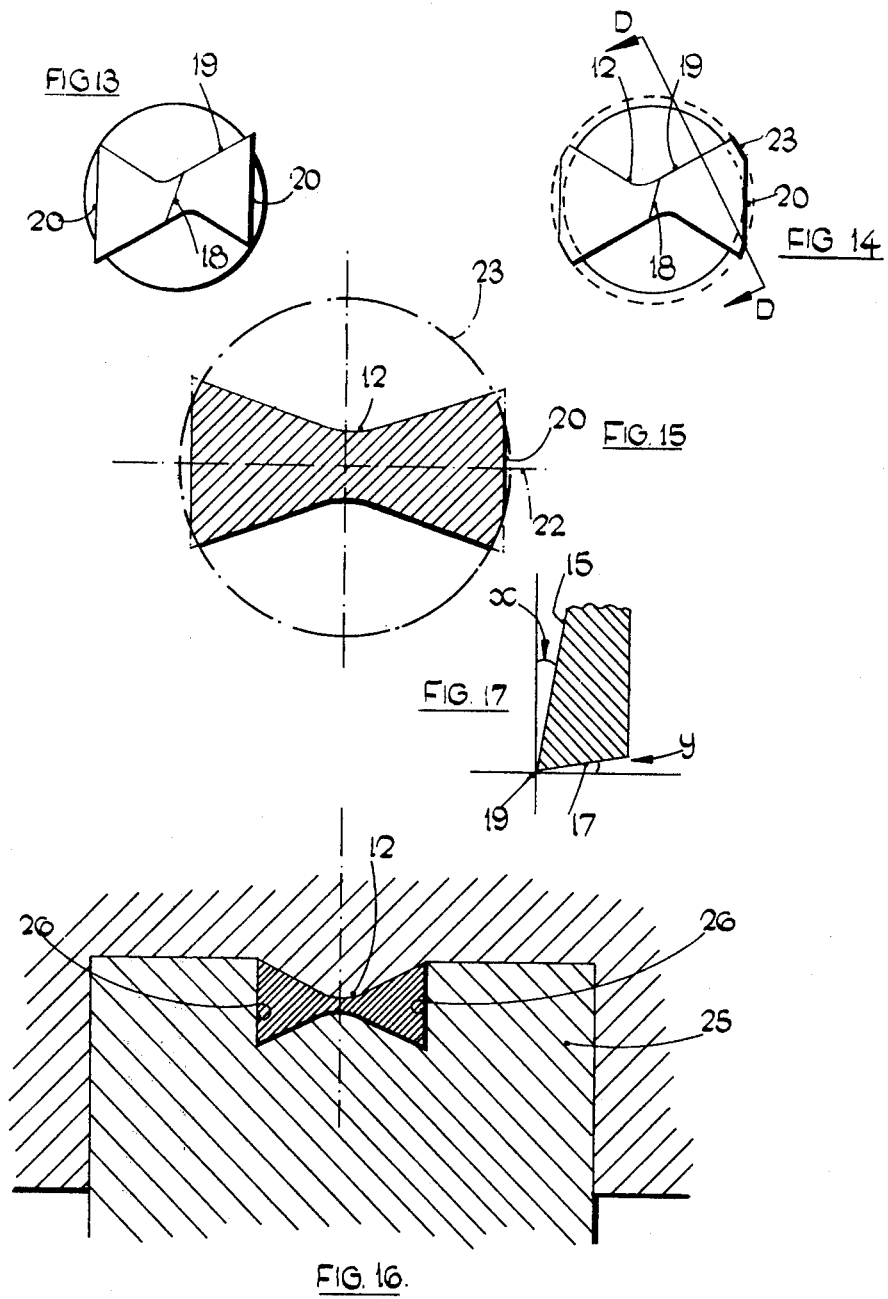

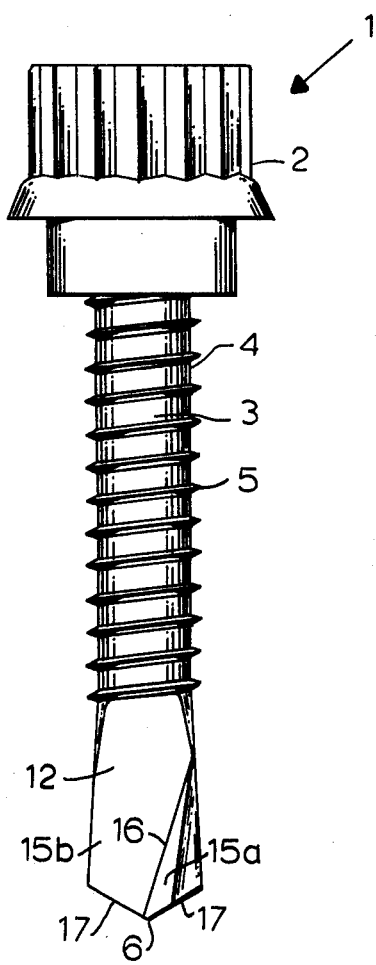

SELF-DRILLING SCREWS

This is a division of application Ser. No. 549,688 filed Feb. 13, 1975.

BACKGROUND OF THE INVENTION

This invention relates to a method of making self-drilling screw and to a screw made thereby.

SUMMARY OF THE INVENTION

It is an object of the invention to provide a new or improved form of self-drilling screw and a new or improved method of making such a screw and of providing a drill point on a fastener blank.

According to the first aspect, the invention provides a method of providing a drill point on a fastener blank comprising the following steps:

Taking a fastener blank having a shank including a generally cylindrical free end portion; hot or cold forming the free end portion between co-operating dies to cause formation of two diametrically opposed straight flutes, said flutes being inclined in opposite directions at equal acute angles to the axis of the shank;

selecting the cross-over point at which the flutes most nearly approach each other across the axis of the shank; and forming two planar faces on the shank, these being oppositely disposed with respect to the axis of the shank and equally angularly inclined thereto, said faces intersecting each other on a line of intersection passing through the axis and at, or slightly spaced from said cross-over point, the line of intersection also being slightly angularly spaced, as measured about the axis of the shank, in advance of the cutting edge of each flute whereby the slope of the associated face away from the line of intersection provides a lip clearance angle behind the cutting edge of each flute.

Preferably the direction of movement of each die part during the formation of the flutes is at an acute angle to both the leading wall and the trailing wall of the flute defined by said die part.

Two further planar surfaces may be formed parallel or generally parallel to the axis of the fastener at the part of the end portion which is of greatest diameter.

The further planar surfaces may be formed by the dies during said hot or cold forming operation, or may be machined.

The method of making the drill point may also include a further step comprising turning to remove the extreme edges of the drill flutes and to form a slight land behind the cutting edge of each flute.

The point formation may be provided with a slight taper in region of the flutes, such that the part of this region adjacent the shank is of smaller transverse dimension than the part nearer the free end.

The invention also provides a self-drilling fastener comprising a head, a shank including an externally screw threaded part adjacent the head and a drill point at the end of the shank remote from the head, said drill point including a pair of diametrically opposed straight flutes said flutes being inclined in opposite directions at equal acute angles to the axis of the shank, and a pair of planar faces oppositely disposed with respect to the axis of the shank and equally angularly inclined thereto, said faces intersecting each other on a line of intersection passing through the axis and disposed at or adjacent an imaginary cross-over point where said straight flutes most nearly approach each other across the axis of the screw, the line of intersection also being slightly angularly spaced, as measured about the axis of the shank, in advance of the cutting edge of each flute, whereby the slope of the associated face away from the line of intersection provides a lip clearance angle behind the cutting edge of each flute.

The fastener may include two further planar surfaces formed on the drill point and disposed parallel or generally parallel to the axis of the fastener at the part of the end portion which is of greatest diameter.

A slight land may be provided behind the cutting edge of each flute by removal of the extreme edges of the drill flutes by turning.

The point formation may be provided with a slight taper in the region of the flutes, such that the part of this region adjacent the shank is of smaller transverse dimension than the part nearer the free end.

The planar faces may intersect above, below, or at, the imaginary cross-over point.

BRIEF DESCRIPTION OF THE DRAWINGS

The invention will now be described in more detail by way of example only with reference to the accompanying drawings in which:

FIG. 1 is a front elevational view of part of a fastener blank after an initial flute forming operation has been performed thereon, FIG. 2 is a view taken along the arrow A in FIG. 1, FIG. 3 is a sectional view taken along the line B—B of FIG. 1, FIG. 4 is a front elevational view of a point formed after a further operation has been performed on the blank, FIG. 5 is an underneath plan view of the drill point shown in FIG. 4, FIG. 6 is an elevational view taken along the arrow C of FIG. 5, FIG. 7 is a front elevational view, similar to FIG. 4, but of an alternative form of point embodying the invention, FIG. 8 is an underneath plan view of the drill point shown in FIG. 7 and similar to the view shown in FIG. 5, FIG. 9 is a diagrammatic elevational view of a point formation on which a further machining operation has been carried out, FIG. 10 is an underneath plan view of the point formation of FIG. 9, FIG. 11 is a view on the arrow D of FIG. 10, FIG. 12 is a view taken at right angles to the view shown in FIG. 9, FIG. 13 is an underneath plan view of a point formation similar to that shown in FIG. 8 but following a further machining operation, FIG. 14 is an underneath plan view similar to FIG. 13 but following a turning operation, FIG. 15 is a sectional view similar to FIG. 3 but illustrating the effect of a turning operation performed on the drill point, FIG. 16 illustrates the formation of a modified form of drill point in a forging die and FIG. 17 is a scrap section on the line E—E of FIG. 14.

FIG. 18 is a view in elevation of a selfdrilling screw embodying the principles of the invention.

DETAILED DESCRIPTION OF THE PREFERRED EMBODIMENT

The formation of a drill point according to the invention starts with the formation of a blank 10. This may be plain or headed and may either by provided with an externally threaded shank or be of such a diameter as to permit a thread of the desired form to be formed thereon. The end of the blank 10 which is to have a drill point formed thereon will be referred to as the "free end portion" 11 and this may be cylindrical or stepped or tapered as desired.

A pair of co-operating dies are used in a hot or cold forming operation on the free end portion to form a pair of straight flutes 12 as shown in FIGS. 1 to 4 of the drawings.

During forming operation, the free end portion of the shank is squeezed between the co-operating dies which are so shaped that the material of the shank flows to provide a pair of straight, diametrically opposed flutes 12 which are inclined in opposite directions so as to define equal acute angles $b$ with respect to the axis 13 of the shank. The flutes are straight and are not helical in formation.

The forming operation will be referred to in more detail later.

The metal displaced by the formation of the flutes 12 forms a pair of bulges 14 and the forming operation is such that these bulges increase the maximum transverse dimension of the point, as measured perpendicular to the shank axis, to a value which is somewhat greater than the desired minor diameter of the threaded portion of the shank. When the final drill point is formed by further operations on the free end portion of the fastener, the size of the hole drilled by the drill point will be sufficient to allow penetration of the fastener but will not be so large that the self tapping thread on the shank portion 10 cannot tap its own hole.

Turning now to FIG. 2 of the drawings, in which we view the partly formed fastener along one of the flutes 12, it will be seen that the flute is of generally V-shape having a pair of side walls 15 which intersect on a straight line 16. These leading and trailing walls are spaced from each other by an included angle of $2a$. The angles $a$ and $b$ referred to above are shown so as to give the correct "rake angle" to the finished drill point, (in a manner to be described later).

Because the flutes are straight and oppositely disposed, there is a point indicated by the arrow X in FIG. 1 at which the centre line 16 of each flute most nearly approaches the other across the axis of the shank. At this point, the web between the two flutes is thinnest and the position of the cross-over point X needs to be established before proceeding to the next step of the pointing operation.

In order to form a satisfactory drill point, it is necessary to perform a machining or other forming operation on the free end portion 11 of the blank which is in the condition shown in FIGS. 1, 2 and 3 of the drawings. Two flat equally angularly inclined planar faces must be formed by machining away or otherwise removing metal from the free end portion 11 of the shank to a point at or adjacent the cross-over point X of the flutes, in order to form a drill point having a chisel shaped extremity and two flutes tapering away therefrom. In the embodiment of FIGS. 1 to 6, the planar faces intersect above the cross-over point; in FIGS. 7, 8, 13 and 14, they intersect below, and in FIG. 9 to 12 they intersect substantially at the cross-over point.

Thus, the machining or other forming operation is carried out to remove metal below the section line B—B in FIG. 1 to produce a preliminary drill point as shown in FIG. 4 of the drawings.

The operation is carried out in any suitable manner which will provide two inclined flat faces. For example, a V-section broaching tool can be applied to the end of the fastener in a direction coinciding with the direction of the desired line of intersection of the two flat faces, that is the chisel point of the finished drill screw. Alternatively, the faces could be performed by milling or grinding for example, provided that they are substantially flat. The faces define equal angles relative to the fastener axis, and in FIG. 6 the complementary angle $d$ is marked, this angle being used later in calculation of the rake angle of the flutes.

Referring to FIGS. 4, 5 and 6 of the drawings, the planar faces are indicated at 17 and their line of intersection, the chisel point of the screw, is indicated at 18.

The position of the line of intersection 18 is an important factor in ensuring that the drill point functions correctly. If the screw is correctly aligned for the formation of the flat faces, 17, the line of intersection 18 will be slightly in advance of each of the cutting edges of the flutes 12. Thus the cutting edge 19 is in each case spaced behind the line 18 defining the chisel point and so that the metal of the screw is sloping away from the line 18 to provide a sufficient lip clearance angle behind the cutting edge 19 of each flute for drilling purposes.

Before the machining operation is carried out, it is necessary to orientate the fastener blanks correctly so that a predetermined angle $c$ is defined between the direction of the arrow C (that is, along the line of intersection 18) and the part of the screw having the widest transverse dimension taken perpendicular to the axis, to ensure that the chisel point is correctly disposed with respect to the cutting edges 19 of the flutes. If a broaching tool is used to form the point, the tool acts in the direction of the arrow C.

In the preliminary point shown in FIGS. 1 to 6 of the drawings, the planar faces 17 intersect just above the cross-over point X of the flutes 12.

In FIGS. 7 and 8 are shown a preliminary point in every way similar to that previously described except that the planar faces 17a intersect just below the cross-over point X (see FIG. 7). This formation means that the cutting edges of the flutes are straight, right up to the chisel point 18a of the screw and this gives somewhat better cutting properties than the previously described embodiment, where a slight radius occurs on the cutting edges adjacent the chisel point. This feature can be seen by comparing the slightly radiused central region of the cutting edge 19 of FIG. 5, with the completely straight cutting edge 19a of FIG. 8.

Further operations are advantageously performed on the perliminary drill point to give good drilling performance and the first such operation is the machining away or otherwise removing of metal from the outwardly bulged portions of the point formation. The effect of this operation is illustrated in FIGS. 9 to 11 which also illustrate the inclined planar faces 17b intersecting substantially at the cross-over point X. In this case the cutting edges 19b of the point formation are again slightly radiused at their intersection with the chisel point 18b.

Referring to FIGS. 9 to 11 of the drawings, a further pair of planar surfaces 20 are provided on the drill point at its widest part, that is the part 14 which is caused to bulge outwardly during the formation of the drill flutes (see FIG. 1). These surfaces 20 may be precisely parallel to each other and equally spaced on opposite sides of the fastener axis or may be inclined towards each other at a small angle such that the widest part of the fastener occurs at the plane indicated by 21 in the drawings. Alternatively the surfaces 20 may be stepped inwardly behind the place indicated at 21.

The surfaces 20 and the faces 17b formed at the point of the screw are all perpendicular to a single imaginary plane generally indicated at 22 in the drawings and passing through the axis of the fastener. The imaginary plane coincides with the plane of the paper in FIG. 11 of the drawings. Because this is the case, it is possible to form the faces 17b and surfaces 20 simultaneously, if desired. However, it is not essential that the surfaces 20 are parallel to the line of intersection 18 of the flat faces 17b if these are machined separately.

To prevent undue wear of, or damage to the cutting edges of the drill flutes, a further turning operation may be performed, as illustrated by comparing FIGS. 13 and 14. This removes the acute angle otherwise left at the flute edges by machining of the planar side surfaces 20. It will be seen that the angle between the turned surface 23 and the cutting edge 19 is greater than 90° and thus the cutting edge is comparatively strong. Preferably, the turning operation does not wholly remove the flat surfaces 20, thereby allowing a clearance behind the flute edges and reducing friction.

If the acute angled edges provided by machining or otherwise forming the flats 20 are left on the screw, some difficulties may occur in drilling of deep holes in particular, since progressive wear takes place particularly on the cutting edges of the flutes and particularly towards the extremity of the point so that an outward taper tends to be formed from the drill point as drilling progresses. A machining operation is performed to remove metal lying outside the circle indicated at 23 in the drawings, thereby removing the extreme edges of the flutes producing a slight land behind the cutting edge of the flute in particular.

The same machining operation may be used to provide a reduction in diameter behind the extreme tip of the drill point so as to provide some chip clearance and reduce frictional resistance to turning. This may result in a shoulder being formed at or adjacent the region indicated at 24 in FIGS. 7 and 9 or may simply provide a straight-forward taper to the forward end of the screw, the part 21 remaining the broadest part of the drill point.

Instead of, or prior to machining the planar side surfaces 20, the sides of the point formation may be flattened during the flute-forming operation. The dies used in the initial flute forming operation may be similar to the arrangement shown diagrammatically in FIG. 16 of the drawings in which the lower die 25 has a pair of flattened laterally opposed surfaces 26 which restrain the metal from flowing outwardly to any great extent at the region 14. This prevents any possibility of rupture occurring around the narrowest part X of the flute formation and also restricts the amount to which the bulges 14 are allowed to be formed. Furthermore, if the dies are shaped with flat surfaces 26, it may not be necessary to carry out a subsequent machining operation to produce the flat planar side surfaces 20.

It will be seen from FIG. 16 that the dies are moved towards each other in a direction which is at an acute angle to the leading and trailing walls of the flutes at any given point, in contrast to a previously proposed method of forming flutes in which the dies were moved together in a direction perpendicular to one pair of faces of the flutes.

By the use of dies such as those shown in FIG. 16 of the drawings, it is possible to provide any desired rake angle on the leading wall of the flute quite readily.

The geometry of the screw point can be chosen to give any suitable rake angle and also to give sufficient lip clearance angle behind the cutting edge 19 of the flute.

The angles $a$ $b$ $c$ and $d$ referred to above may be selected and by simple trigonometry it is possible to derive certain intermediate angles $p$, $q$ which can be used to calculate the values of rake angle and lip clearance angle obtained using the chosen values of $a$ $b$ $c$ and $d$.

FIG. 17 is a sectional view on the line E—E of FIG. 14 and indicates the position of the rake angle $x$ and lip clearance $y$. This section is taken in a plane parallel to the axis of the screw and intersecting the leading wall at an angle of 90°. The rake angle $x$ enables the chippings thrown up by the drill point to be cleared away upwardly from the point and the lip clearance $y$ enables frictional resistance to rotation of the drill point to be kept to a minimum, even if some wear occurs on the extreme cutting edge.

The relationship between the chosen angles $a$ $b$ $c$ and $d$ and the derived intermedate angles $p$ and $q$ are as follows:

$$\operatorname{Tan} p = \frac{\operatorname{Tan} a}{\operatorname{Cos} b}$$

$$q = c + p - 90°$$

Having derived the intermediate angles $p$ and $q$, the rake angle $x$ can be calculated according to the following equation.

$$\operatorname{Tan} x = \operatorname{Tan} b \cdot \operatorname{Cos} p$$

The lip clearance angle $y$ can be calculated from the following relation.

$$\operatorname{Tan} y = \operatorname{Tan} d \operatorname{Cos} q$$

Thus for example if $$\left. \begin{array}{l} a = 60° \\ b = 20° \\ c = 70° \\ d = 30° \end{array} \right\} \text{ then } \begin{array}{l} x = 10° \text{ approximately} \\ y = 23° \text{ approximately} \end{array}$$

It will be appreciated that a change in any one of the chosen variables $a$ $b$ $c$ or $d$ will give rise to a change in the rake angle and lip clearance angle.

FIG. 18 shows a self-drilling screw 1 having a head 2, a shank 3 with an externally screw-threaded part 4 adjacent the head 2 and having a thread 5, and a drill point 6 which includes a pair of diametrically opposite straight flutes 12. Each flute 12 has a leading face 15a and a trailing face 15b, as previously described meeting each other along a straight line 16.

I claim:

1. A self-drilling fastener comprising a head, a shank including an externally screw-threaded part adjacent the head and a drill point at the end of the shank remote from the head for drilling through relatively thick metal, said drill point occupying a relatively long portion of the shank and including a pair of diametrically opposed straight flutes being substantially limited to said drill point, said flutes being inclined in opposite directions at equal acute angles to the axis of the shank, each flute being defined by a leading face and trailing face inclined relative to each other at an angle of approximately 120°, and meeting each other along a straight line inclined to said axis, said straight line and said axis being askew with respect to each other, and a pair of planar faces at the free end of the drill point, said planar faces being oppositely disposed with respect to the axis of the shank and equally angularly inclined thereto, said planar faces intersecting each other on a line of intersection passing through the axis and disposed at or closely adjacent an imaginary cross-over point where said straight lines of said straight flutes most nearly approach each other across the axis of the shank, the line of intersection also being slightly angularly spaced, as measured about the axis of the shank, in advance of the cutting edge of each flute, and a lip clearance angle being provided behind the cutting edge of each flute by the slope of the planar face away from said line of intersection.

* * * * *